US007454216B2

(12) United States Patent
Shikano et al.

(10) Patent No.: US 7,454,216 B2
(45) Date of Patent: Nov. 18, 2008

(54) IN-FACILITY INFORMATION PROVISION SYSTEM AND IN-FACILITY INFORMATION PROVISION METHOD

(75) Inventors: Hiroaki Shikano, Kokubunji (JP); Naohiko Irie, Kokubunji (JP); Atsushi Ito, Tokyo (JP); Junji Inaba, Hiratsuka (JP); Mitsuru Inoue, Hiratsuka (JP); Kazutaka Sakai, Yamato (JP)

(73) Assignee: Hitachi, Ltd., Tokyo (JP)

( * ) Notice: Subject to any disclaimer, the term of this patent is extended or adjusted under 35 U.S.C. 154(b) by 651 days.

(21) Appl. No.: 11/071,342

(22) Filed: Mar. 4, 2005

(65) Prior Publication Data

US 2006/0040679 A1 Feb. 23, 2006

(30) Foreign Application Priority Data

Aug. 19, 2004 (JP) ............................ 2004-239130

(51) Int. Cl.
*H04Q 7/20* (2006.01)

(52) U.S. Cl. ................................ 455/456.3; 340/573.4

(58) Field of Classification Search .................. 455/39, 455/41.2, 403, 422.1, 456.1, 456.3; 340/573.4
See application file for complete search history.

(56) References Cited

FOREIGN PATENT DOCUMENTS

| | | |
|---|---|---|
| JP | 2000-236571 | 2/1999 |
| JP | 2002-26804 | 7/2000 |

*Primary Examiner*—Bentsu Ro
*Assistant Examiner*—David S Luo
(74) *Attorney, Agent, or Firm*—Reed Smith LLP; Stanley P. Fisher, Esq.; Juan Carlos A. Marquez, Esq.

(57) ABSTRACT

To enable an appropriate change of a path according to a situation of a user and a situation of a target store and the path without having a special terminal when the user of a facility utilizes the target store and an appropriate guidance, spatial recognition nodes respectively provided with a sensor and information processing equipment are installed in each location in the facility and connected via a network. The nodes recognize the position, the action and the behavior of a user of the facility. A server controlling a system manages the recognition result and constantly grasps the situation of the user. The situation of the user is recognized by the node installed at a destination and on a path, and notified to the server. The server displays appropriate path information based on the recognition result on any of plural information displays installed in the facility when the user approaches.

16 Claims, 15 Drawing Sheets

POSITION DETECTION SPACE VIEW

ANGLE DATA TRANSMISSION FORMAT

IN-FACILITY INFORMATION PROVISION SYSTEM AND IN-FACILITY INFORMATION PROVISION METHOD

CLAIM OF PRIORITY

The present application claims priority from Japanese application JP 2004-239130 filed on Aug. 19, 2004, the content of which is hereby incorporated by reference into this application.

FIELD OF THE INVENTION

The present invention relates to an information provision system for providing appropriate information and an in-facility information provision method according to positions and behaviors of a user in facilities where unspecified multiple users visit.

BACKGROUND OF THE INVENTION

Recently, various large-scale commercial facilities are newly developed according to urban redevelopment and some to which more than 100 stores belong exist. It comes into question how the information of stores and merchandise diversified as described above is to be transmitted to a user. For a system provided for it, there is an in-facility information management system using a wireless terminal such as that in Japanese Patent Laid-Open Application No. 2000-236571 or Japanese Patent Laid-Open Application No. 2002-026804. In the Japanese Patent Laid-Open Application No. 2000-236571, a system for detecting and storing the positions and the moving history of a user by a wireless mobile terminal provided with proper identification information and a radio base station and for providing path information to a destination for example based on them to the wireless mobile terminal is proposed.

SUMMARY OF THE INVENTION

In the prior art, to detect the position of a user utilizing a wireless terminal such as a mobile telephone and an IC tag, all users who want the provision of information are required to have the corresponding wireless terminal. Therefore, the prior art has a problem that information provision service cannot be provided to a person who does not have the corresponding equipment and a person who is not good at the operation of equipment.

Besides, the prior art also has another problem that as the behavior of a user who wants information provision, for example, information that the user loses his/her way or is tired cannot be acquired even if the user has a wireless terminal, information provision service according to a situation on the spot of the user cannot be provided.

Further, to grasp the current situation in facilities which is effective information for a user who wants information provision, for example, a situation such as a degree of the crowdedness of a store which the user wants to visit and a degree of the noteworthiness of a store at real time, all users in facilities are required to have a wireless terminal according to prior art in spite of users' need of such information provision service. In case the wireless terminal is hardly popularized, it is difficult to collect the current situation in such facilities and transmit information corresponding to the situation to users at real time.

An object of the present invention is to provide an in-facility information provision system and an in-facility information provision method in which the service of precise lo information according to a situation of a user himself/herself at that time and a situation of a store to be utilized of a destination and a path to it can be taken without carrying a special terminal together when an unspecified user utilizes a target store in facilities.

A brief description of the summary of a representative out of the inventions disclosed in this application to solve the above-mentioned problems is as follows.

The representative invention provides an in-facility information provision system which is an information processing system that generates and outputs information for unspecified users who visit facilities, wherein a plurality of plural spatial recognition nodes are respectively installed in plural locations of the facilities, each of said spatial recognition node has recognition unit including a sensor, comprising: profile information in which recognition operation corresponding to each environment of a user and a system response are defined as a profile beforehand on the presumption of plural environments where the user is put in the facilities; a unit for grasping the specific user in the facilities based on information acquired by the sensor and the profile information and recognizing his/her behavior; a unit for determining response operation to the user based on the result of recognition; and a unit for generating and outputting information for the user corresponding to the response operation.

According to the invention, an information system for enabling information provision in facilities to unspecified users who visit the facilities according to the position and the behavior of the users without the operation of a terminal and the like can be configured.

DETAILED DESCRIPTION OF THE PREFERRED EMBODIMENT

For a representative example of embodiments of the invention, a guidance system in large-scale commercial facilities can be given and will be described below. First, the general configuration of the system will be described.

Figure 1:
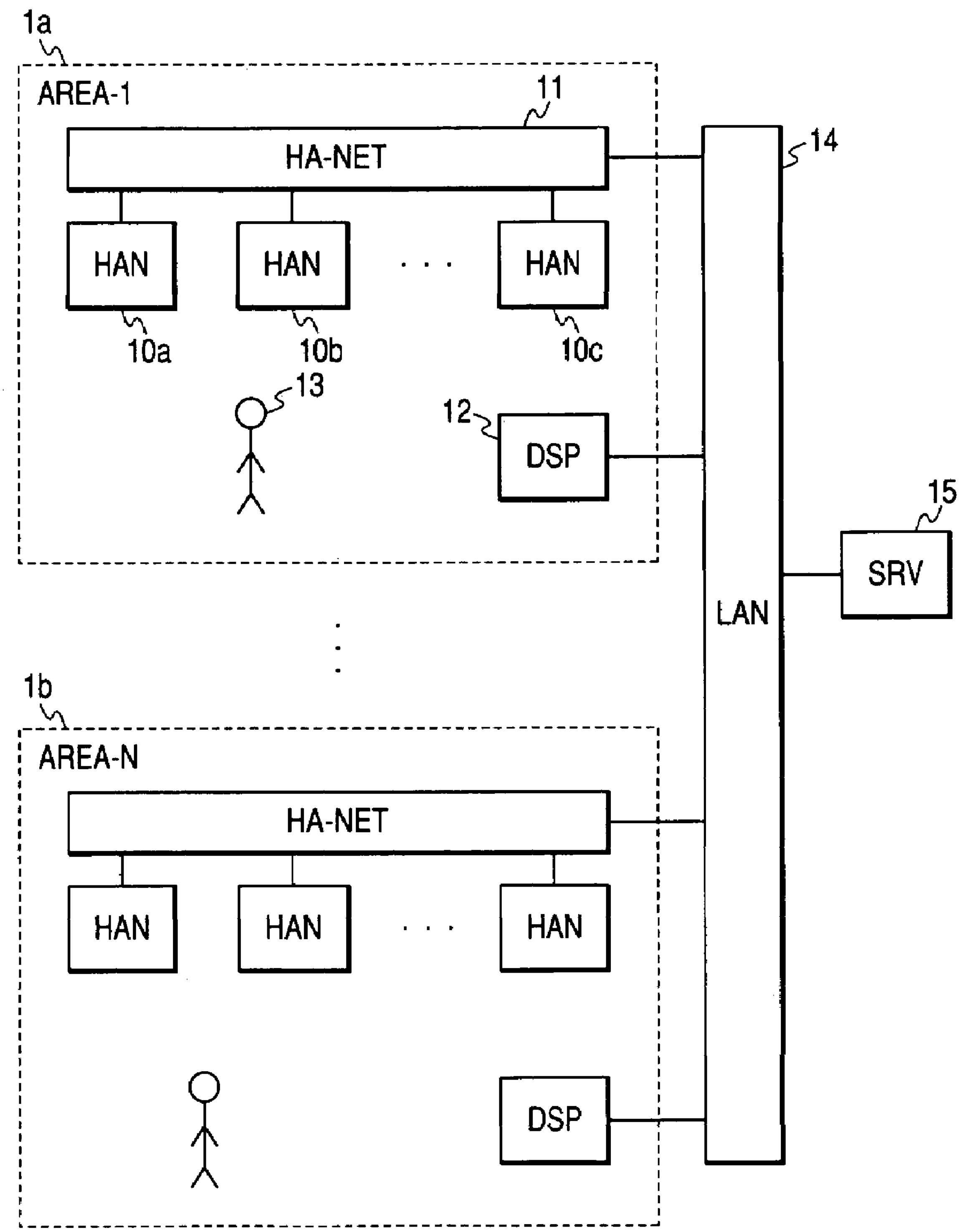
FIG. 1 is a block diagram showing the whole system according to the invention.

FIG. 1 is a block diagram showing the whole system. Spatial recognition nodes HAN (10*a* to 10*c*) provided with a sensor such as a camera and an information processing unit are installed in positions in which at least three HANs can catch a service user (13) in plural locations (1*a*, 1*b*) such as a store, rest space, a passage and an entrance/exit in the commercial facilities, and each HAN is mutually connected via a network HA-NET (11) in any of the corresponding locations. A range which one HA-NET covers is limited to a fixed spatial range such as a store, a rest spot, stairs and a passage and plural HA-NETs continuously cover the whole service space in the facilities. The number of HANs installed in one location covered by HA-NET may be arbitrary according to the area of the corresponding location to be recognized space, the number of service users (13), a function for recognition required for realizing service and the type and the performance of sensors with which HAN is provided. Network connection means may be also wired or wireless.

The corresponding HA-NET is connected to a local area network LAN (14). A server SRV (15) is connected to LAN. The number of servers is different depending upon the scale of facilities, the number of users and the type of provision service, however, in this embodiment, one server is installed in the facilities. SRV (15) executes control over the operation of each HAN, the distribution of an operational procedure program, the management of the position and the situation of a user, the management of personal information such as the history of visits and the taste of a user and the management of a situation such as the facility information of the commercial facilities and the number of users who visit a store.

To realize the above-mentioned functions, in SRV, information such as map information in the facilities, the position of HAN, plural recognition program modules, store/facility information, user profile information, the history of the behavior of a user, the position and the situation of a user, the number of users in the corresponding location is registered and the corresponding information can be appropriately distributed to HAN. Various information is provided to the user (13) from SRV and HAN by installing an responding device such as an information display DSP (12) at the representative point of each location, for example, an entrance/exit of an elevator, a step of an escalator, a branch point of a passage and an entrance of a store and connecting it to LAN. In the invention, HA-NET and the local area network LAN are merely called a communication network together.

Figure 2A:
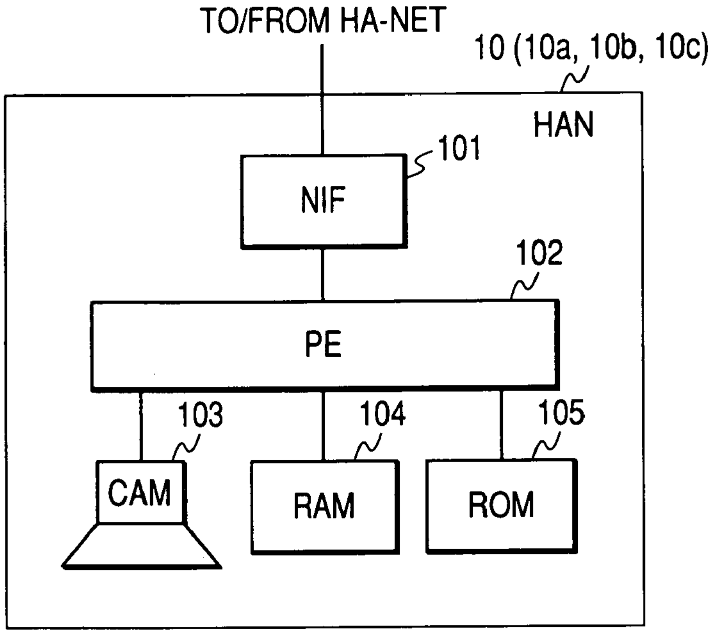
FIG. 2A is a block diagram showing a spatial recognition node to be the basic configuration of the system shown in FIG. 1.

Next, the configuration of the spatial recognition node HAN (10) will be described. FIG. 2A is a block diagram showing the configuration of HAN. HAN (10) includes a camera CAM (103), processing equipment (102), a read only memory ROM (105), a memory RAM (104) and a network interface NIF (101). CAM (103) catches a spatial situation by an image, however, in addition to CAM (103), a microphone and any of various sensors such as a temperature sensor, a humidity sensor, a pressure sensor and a vibration sensor may be also combined according to the object of recognition.

Next, position detecting unit in this system will be described. In this embodiment, in facilities which unspecified multiple users visit, it is one object to recognize the behavior of a specific user in the facilities such as "the user (13) loses his/her way." That is, the face and the gesture of the user are required to be caught and recognized in any location of the facilities. Then, the facilities are divided into plural locations 1*a*, 1*b*, 1*n* and in each location, spatial recognition nodes HAN (10*a* to 10*c*) are arranged at three points. The number of nodes may be also four or more.

Figure 2B:
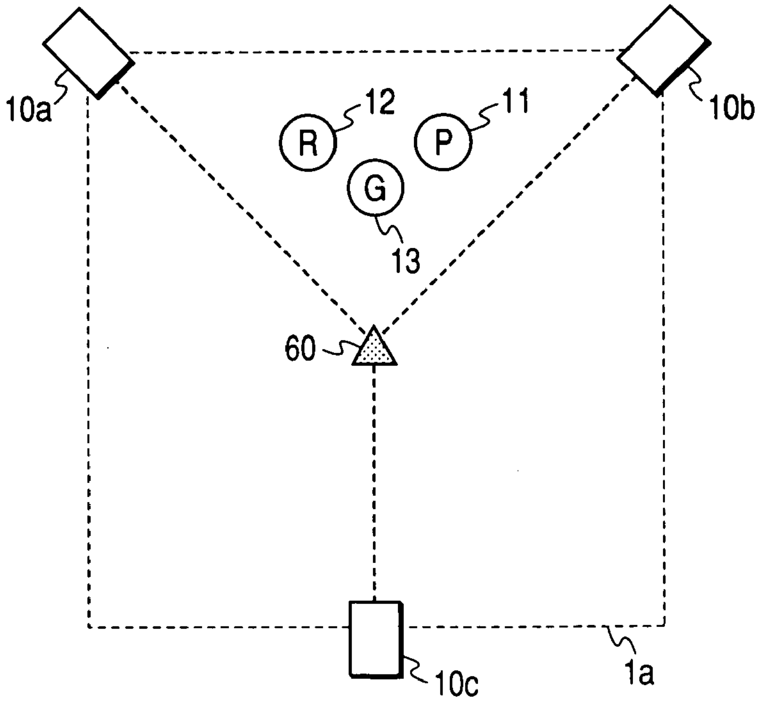
FIG. 2B shows the positional relation of cameras in the spatial recognition node HAN in the system shown in FIG. 1.

As shown in FIG. 2B, in all spatial recognition nodes HAN (10*a* to 10*c*) in each location, the directions of the camera are determined so that the center line of the camera is overlapped with a center point (60) of space in each location. In this system, the position of the specific user (13), the outside characteristics such as the face of the user and the behavior which are respectively the contents of recognition are detected by an cooperative recognition process by these plural nodes and control over information provision to the specific user (13) by the information display DSP (12) is made based on the result by these plural nodes. Hereby, as a function required for one node in each HAN is limited, the load of processing on each node (10*a* to 10*c*) can be reduced.

As shown in FIG. 2A again, an image caught by CAM (103) is once stored in RAM (104), the processing equipment PE (102) sequentially reads the image, the image is processed according to a procedure stored in ROM (105) and RAM (104), and the result is stored in RAM (104). The processing equipment PE (102) transmits the result stored in RAM by communicating with another HAN (10) and SRV (15) via the network interface NIF (101). Further, PE (102) receives the result of processing from another HAN via NIF, control information and a program from SRV and stores them in RAM.

For example, in RAM (104), a position detection module, a body part recognition module, a traffic line trace module, a situation judgment module, a response operation determination module and others are stored as a program. These programs are distributed from SRV (15) via LAN (14) and HA-NET (11).

Figure 2C:
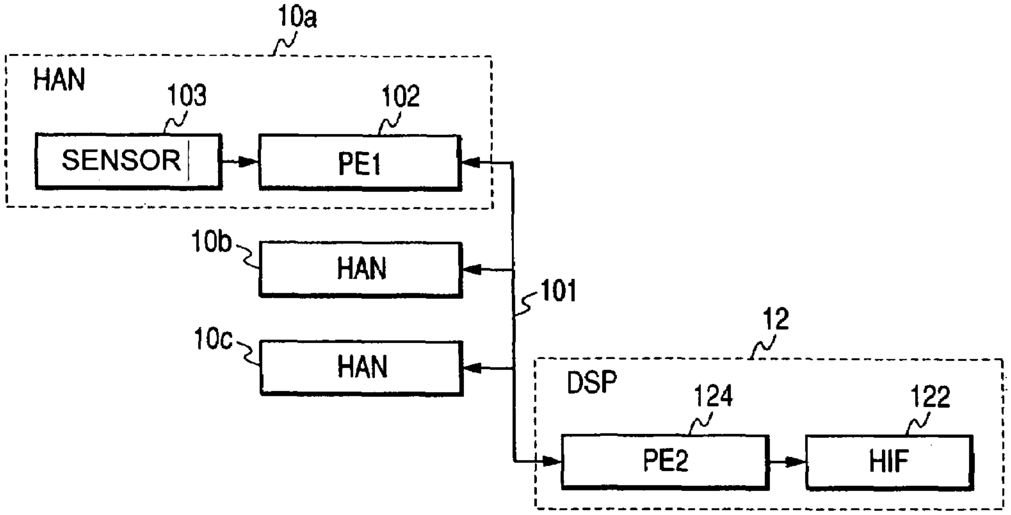
FIG. 2C shows relation between the spatial recognition node HAN and an information display DSP in the system shown in FIG. 1.

FIG. 2C shows relation between the spatial recognition nodes HAN (10*a* to 10*c*) and the information display DSP (12) in this system. Each sensing node (recognition processing equipment) HAN (10*a* to 10*c*) includes a sensor (103) such as the camera CAM (103) and information processing equipment PE1 (102) that applies a recognition process to a dynamic image photographed by the camera. These plural sensing nodes HAN are mutually connected via the network interface NIF (101) and a communication network and are also connected to the information display DSP (12) and the server (15). The communication network may be also a wired network such as USB and Ethernet and may be also a wireless network such as wireless LAN and Bluetooth.

The information display DSP (12) as automatic response equipment includes a human interface HIF (122) to be means for providing and receiving information to/from the user such as a display, a speaker, a motor and LED and information processing equipment PE2 (124) that decodes a command and executes the autonomous control of the human interface HIF. It is desirable that these pieces of information processing equipment PE1, PE2 (102, 124) are built in HAN which is the sensing node and the information display DSP. One sensing node can be small-sized by building them in HAN (10*a* to 10*c*) which is the sensing node and the information display DSP (12) and more sensing nodes can be arranged in one space.

However, in case the processing performance of the processing equipment embedded in HAN or DSP is insufficient, the existing information processing equipment such as a personal computer may be also utilized. The information display DSP (12) is configured as a responder combined with a robot and may be also combined with guidance by voice and a directional indication by the motion of a hand in addition to guidance on a screen.

In this system, the server for controlling the sensing nodes HAN (10*a* to 10*c*) and the information display DSP (12) is not separately provided, dynamically determines a master that executes an integrated control process between the plural sensing nodes and the automatic responder, and the node or the responder which is the master also simultaneously executes the integrated control process. Information required by the target user can be received from another sensing node by setting the responder closest to each target user to the master for example and dynamically configuring the communication network with the circumferential node and the corresponding user can separately receive desired service.

Figure 2D:
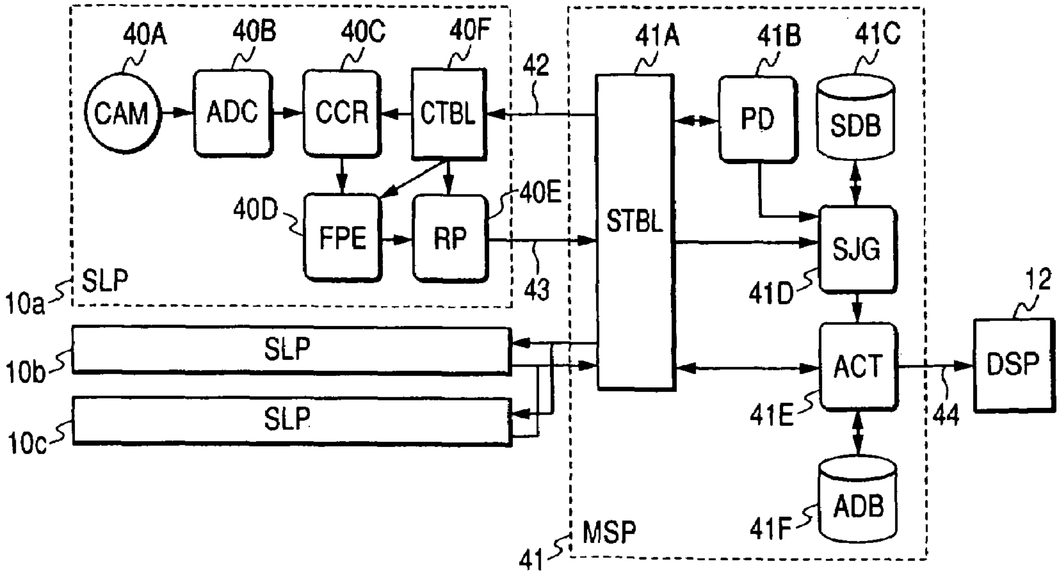
FIG. 2D shows the outline of each processing of a master processor MSP and a slave processor SLP in the system shown in FIG. 1.

Next, FIG. 2D shows the outline of processing by a master processor MSP (41) and a slave processor SLP in this system. Each sensing node (10*a* to 10*c*) executes a recognition process as the slave processor. The sensing node allocated as the master also functions as the master processor. That is, for each sensing node (10*a* to 10*c*), both operation of the master processor MSP (41) and the slave processor SLP is allowed and actually, the sensing node allocated as the master is operated as the master processor MSP (41). In the slave processor SLP, image data acquired by a camera CAM (40A) is converted from analog to digital ADC (40B), YUV-RGB color conversion and a filtering process CCR (40C) are executed based on master control data (42) via a control table CTBL (40F), and feature extraction FPE (40D) such as the detection of a moving object, the detection of a face and the detection of specific color is performed. Afterward, a process RP (40E) for recognizing the center of gravity of the moving object, the coordinates on image data acquired by the camera of the face and the type of gesture is executed based on the acquired features and operated module information (43) is written to a control table STBL (41A) in the master processor in a form updated at any time.

Each processing module for correction, the extraction of features and a recognition process respectively executed on the slave side is stored in the control table as a profile beforehand, the operation is controlled by the master side, and control for the setting of an operated module and the stop of an unnecessary module is enabled based on the operated module information written to the control table STBL (41A) by the master. As the extraction of features is executed by each sensing node 10*a* to 10*c*), an amount of data transmission to the master processor can be reduced, compared with a case that image data itself is transmitted. Further, as image processing which is relatively large in quantity is distributed to each sensing node (10*a* to 10*c*), a load in the master processor can be reduced, compared with the case that image data is transmitted to the master processor as it is.

The mater processor MSP (41) stores the result of the recognition process from each sensing node (10*a* to 10*c*) in the control table STBL (41A) and executes a desired recognition process by extracting the result from the table. For example, the master processor executes the determination of the position PD (41B) of the users based on the positional information of the users acquired from each node. Besides, the master processor executes situation judgment SJG (41D) such as the detection of the variation of an environment and the variation of a situation in space based on rule data in a situation database SDB (41C) based on the determined positional information, behavior information identified by the recognition of the behavior at the corresponding node and the result of the detection of the face performed at the node, and executes the issuance (44) of an action command ACT (41E) to the information display DSP (12) based on the result. The action command is configured as an object in which detailed operation such as display on the information display DSP is defined based on information in an action rule database ADB (41F) corresponding to the automatic responder.

Figure 2E:
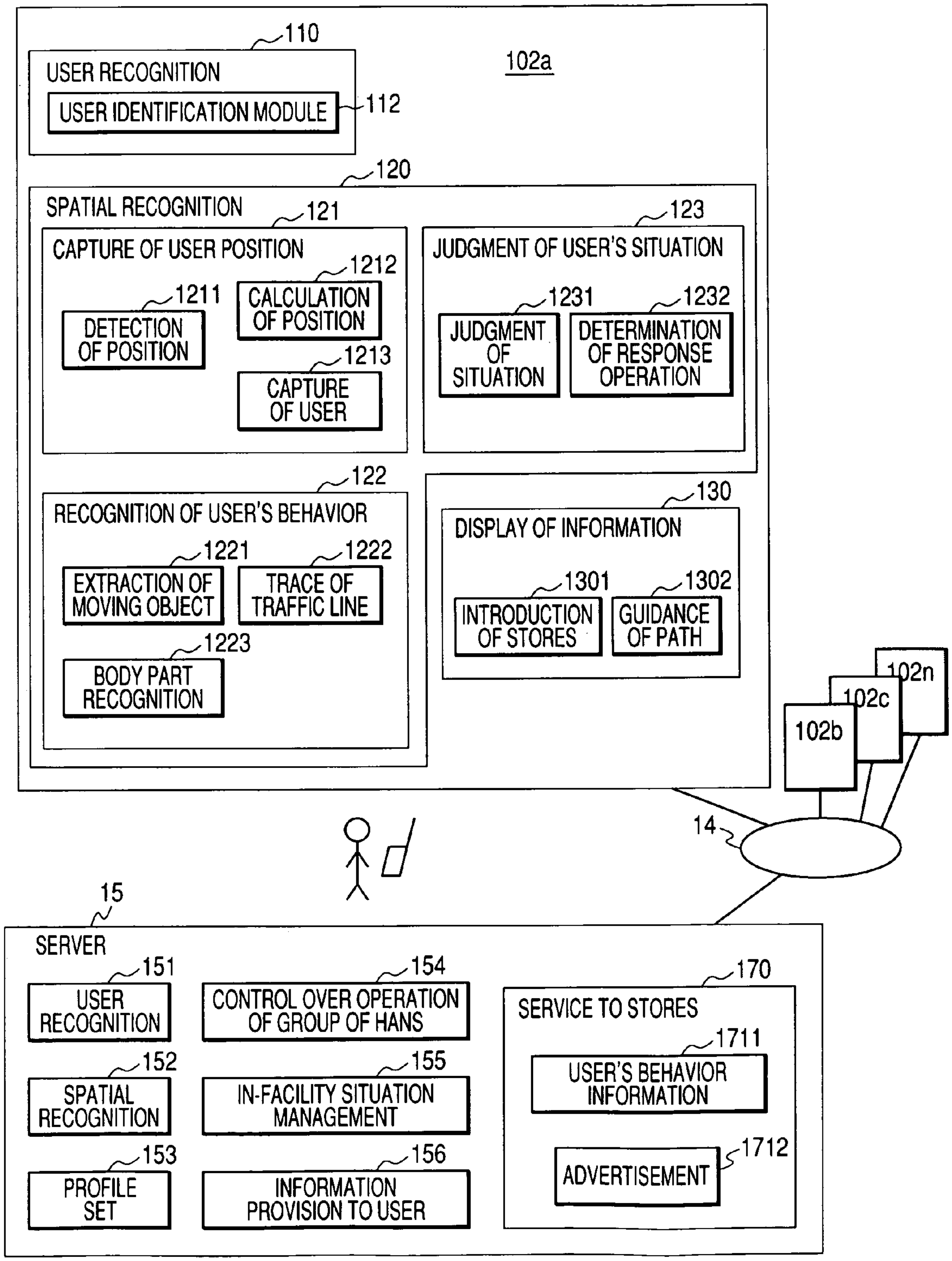
FIG. 2E shows representative units or functions given by a program stored in RAM of each spatial recognition node HAN and a memory of a server in the system shown in FIG. 1 and executed.

FIG. 2E shows representative units (or functions) given by a program stored in RAM (104) of each spatial recognition node HAN and the memory of the server 15 and executed on a computer. These units (or functions) are realized by one or plural programs. First, the units (or functions) with which HAN is provided are roughly divided into a user recognition unit (a user recognition function) 110 for identifying a user, a spatial recognition unit(a spatial recognition function) 120 and a guidance display unit (a guidance display function) 130.

The user recognition function 110 is a function for recognizing a user who visits the large-scale commercial facilities and is provided with a user identification module 112.

The spatial recognition function 120 is a function for recognizing the position of the user in any location in the commercial facilities and a situation in which the user is put such as "tired" and "stray" in the linkage of plural spatial recognition nodes HAN, and a user position capture function 121, a user's behavior recognition function 122 and a user's situation judgment function 123 are included. In the user position capture function 121, a position detection module 1211, a position calculation module 1212 and a user capture module 1213 are included. In the user's behavior recognition function 122, a moving object extraction module 1221, a traffic line trace module 1222 and a body part recognition module 1223 are included. Further, in the user's situation judgment function 123, a situation judgment module 1231 and a response operation determination module 1232 are included.

The guidance display function 130 includes a function for receiving input information for service provision to a user such as the introduction of stores, the guidance of resting places and the guidance of a path and displaying output information. For a module for introducing stores, for example, there are a store introduction module 1301 and a path guidance module 1302.

The server 15 provides optimum information according to a user's situation every user by providing a system response to the user based on the result of recognition by the spatial recognition node HAN. For a function for realizing it, the server is provided with the similar user recognition function 151, the similar spatial recognition function 152 and the similar information provision function 153 to a user respectively to that of HAN. The server is also provided with a function 154 for managing the whole operation of a group of the spatial recognition nodes HAN in facilities, a function 155 for grasping and managing each facility in the facilities and a situation of equipment and others and a function 170 for providing service to stores in the facilities. In the function 170 for providing service to stores in the facilities, a user's behavior information provision function 1711 and an advertisement function 1712 are included.

One object in this embodiment is to recognize the position of a user in the commercial facilities and a situation in which the user is put such as "tired" and "stray" by the spatial recognition function 120 in the linkage of the plural spatial recognition nodes HAN (10*a* to 10*c*). Then, the physical position of the user and a situation divided in a direction of a time base with the user him/herself such as "tired" and "stray" are defined as an environment. In this system, recognition and a system response matched with the environment of a user are defined as a profile beforehand on the presumption of various environment by which the user is surrounded. When HAN receives the profile from SRV and is operated according to the profile, the various situations of a user can be identified.

As the environment is different in every user, HAN that catches a user constantly identifies the environment of the user and receives the corresponding profile from SRV. Therefore, the corresponding HAN has to execute only a required function specified in the profile. Therefore, all HANs are not required to execute the same recognition operation and as each HAN that executes the profile judges a situation of the corresponding user, a load of the whole system can be dispersed and reduced. In case HAN catches plural users, it simultaneously manages plural profiles. Or the corresponding process is transferred from HAN that catches the user to HAN having only a small load at that time.

Next, the switching of an environment will be described. By the movement of a location of a user and depending upon the action of a user such as specific operation, the switching of an environment occurs. For example, in case a user moves from a passage in the facilities to a store, an in-store profile is applied, and recognition unit, operation and a response are changed. For example, in a store, a program for catching the traffic line of the user and the movement of his/her head is executed, in case operation in which the head is frequently shaken horizontally is recognized, it is judged that the user searches merchandise, the system calls a salesclerk. In case the variation of action occurs such as a user stops on the passage in the facilities, the current profile is also changed to a profile according to the operation and a body part recognition module for recognizing the motion of a body such as a user's head and hand is executed. At this time, in case his/her head is horizontally shaken, it is judged that a user is stray and a destination is told to the user via DSP.

As described above, in this system, recognition operation appropriate to that environment is executed by selecting a profile appropriate to a situation of that environment out of plural environment profiles defined beforehand according to the position and a situation of a user and switching to it. Optimum information provision according to a situation of each user is enabled by providing a system response to the user based on the result of recognition.

Next, the user recognition function for identifying a user by the user identification module and others will be described. The system identifies a user by the active operation of the user, for example the insertion of an IC card using a user information input terminal installed at the entrance of the facilities and others, and generates an ID number proper to the user in the system. Besides, when input is made on the terminal, the system also catches the characteristic information such as the face and the clothes of the user by HAN installed in the vicinity of the terminal, relates it with the ID number, and stores the characteristic information in SRV.

When relating is once finished, the user and ID are constantly related by the user position detection/capture functions for continuously capturing the user by plural HANs and the system can identify the user. That is, HAN can constantly capture the motion of the user in space by recognizing a direction of the movement according to the movement of the user, further notifying another HAN that exists in the direction of the movement of the user's ID number via HAN-NET and continuously switching a position detection process.

The characteristic information caught at the entrance is also added to the capture of a user and even if the capture fails, the user is captured again based on the characteristic information obtained at the entrance. In case the capture is impossible, the system notifies the user of recertification, temporarily stops service provision, and resumes the capture of the user and service when the user certifies again using his/her IC card and others on the nearest terminal. Therefore, the user is not required to have special equipment required for the system to recognize his/her position, for example, a wireless tag and an optical beacon for constantly transmitting personal ID by wireless together. However, these pieces of equipment can be also utilized as auxiliary means for capturing a user (for enhancing position detection precision).

Figure 3:
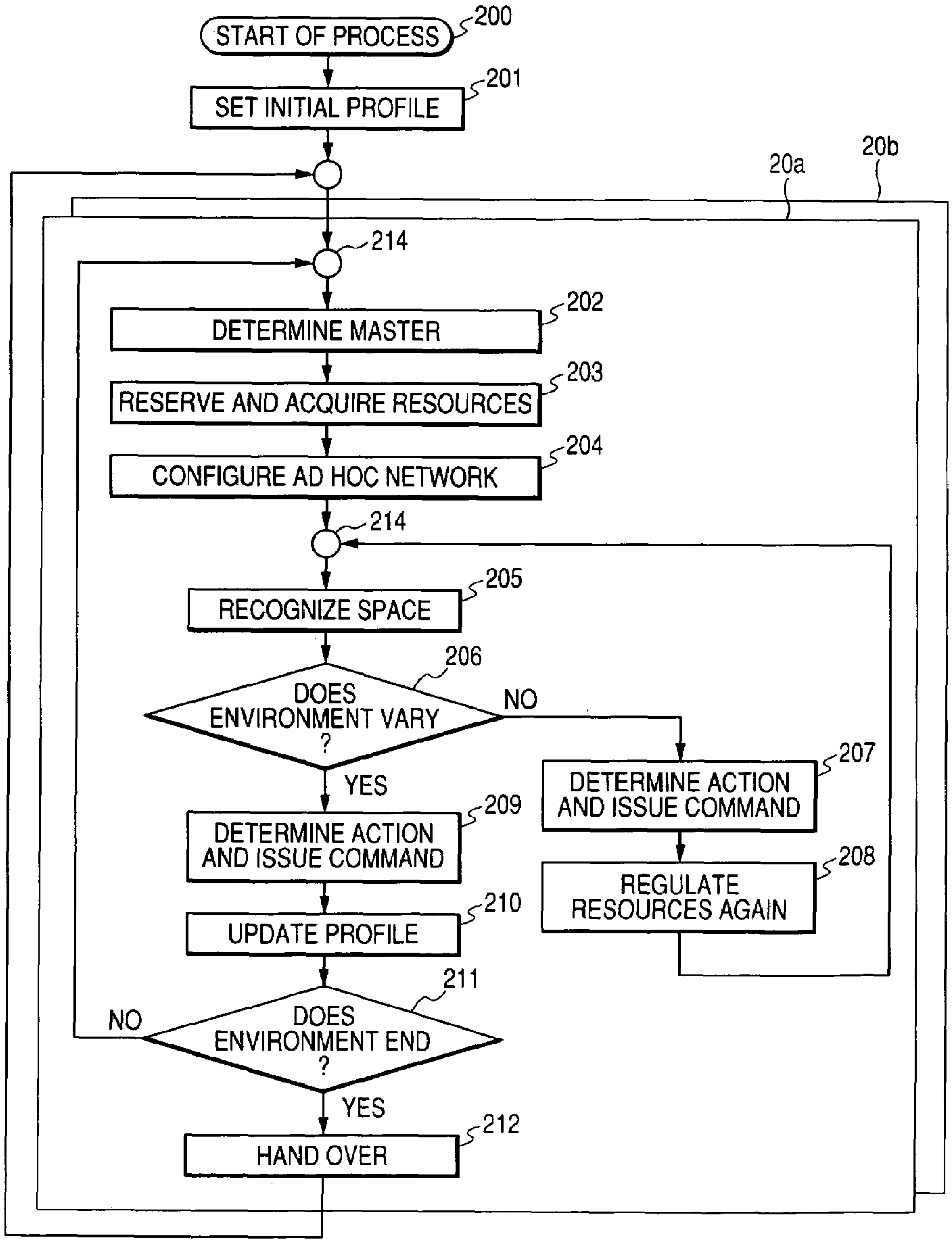
FIG. 3 is a flowchart showing the operation of the spatial recognition node HAN.

Next, referring to FIG. 3, a flow of a process based on the spatial recognition function and a basic process related to recognition in space (by HAN) will be described. In this case, to facilitate understanding, a flow of processing by HAN for one supposed user will be described below. When the process is started (200), HAN (10*a* to 10*c*) sets an initial profile showing a procedure for operation in an initial state (201). The initial state of this system is equivalent to a state in which no user is detected. The state in which no user is detected means a situation in which no visitor exists in space to be recognized, that is, a situation in which no target user exists. In the corresponding profile, the position of HAN, other HANs which exist in the space to be recognized, the position of a responder such as DSP, a procedure for operation and a recognition program are defined.

Next, a master that applies a profile process related to an environment to the user is determined (202). In the initial state when the process is started, HAN that covers the entrance/exit in the space to be recognized shall be the master. After the master is determined, it reserves the utilization of circumferential HANs and the responder such as DSP respectively required for recognition operation defined in the profile (203) and configures an ad hoc network by plural HANs (204).

Initial setting is finished by the above-mentioned and the process based on the spatial recognition function is started (205). In this case, the position detection module (121) is activated and a process for detecting the position of the user in the space and capturing it is executed. In the situation in which no user is detected, HAN detects the user (13) that enters the space. When the user enters the space to be recognized, the user receives notice that the user enters the space from HAN in adjacent another space to be recognized that exists in a direction in which the user enters the space by the user recognition function together with an ID number for identifying the user. When the user enters, an environment in which no user is detected changes to an environment in which a user is captured, and for the next action (209), HAN which is the master updates the profile by initiating the capture of the user, simultaneously notifying the server of the ID number of the user and receiving a profile of the environment related to the user (210).

To make the operational flow clearly understandable, it is supposed that the space to be recognized is a passage in the facilities and one user is moving toward a certain store. That is, HAN which currently captures the user by the user position detection function and the user capture function receives a profile that the user is moving toward a destination (210). At this time, the user is moving in the space and the environment is not finished (211).

Next, HAN that executes recognition operation defined in the profile by the user's behavior recognition function, that is, a process for position detection and traffic line extraction for recognizing "tired" and "stray" is searched (203) and spatial recognition operation is initiated again (205). These processes are executed using the moving object extraction module, the traffic line trace module and the body part recognition module. The environment is unchanged, however, in case the action of the user varies, for example, in case the user stops as already described, a situation of the user is judged, master HAN that manages the profile sends a response command to the responder such as DSP (207) if necessary and applies system response operation to the user. The situation judgment module is used for judging a situation of the user. Further, master HAN determines recognition operation to be executed next (the detection of the motion of a body part), searches HAN required for the recognition operation (208), and applies a recognition process to the user again (205). In case an environment which the system has is not coincident with the environment of the user, control is returned to the initial profile that the user is moving toward the destination in fixed time.

In case the user moves from the space to be recognized to another space, the system which has close recognition space as an object is required to be notified of the change of the environment in each recognition space. That is, in case an environment is regarded as physical space with the corresponding person in the center, the handover (212) of the environment is required. In case the environment in the space to be recognized is finished (211) because the person moves, that is, in case the object of recognition (the visitor) moves from the space to be recognized to adjacent space, the master in the space enables tracing the user by the linkage of plural systems in large space by handing over the environment to a master of a system in the adjacent space.

The case that one user is presumed is described above, however, in case plural users exist, the similar process is also enabled. For example, in case plural users exist on the passage in the facilities, the flow of the processes (20*a*, 20*b*) shown in FIG. 3 have only to be executed in parallel. If information processing equipment PU1 of each node is a multiprocessor provided with plural processors, parallel processing is enabled by allocating the flow of processes (20*a*, 20*b*) to different processors. In case the information processing equipment PU1 of each node is provided with only one processor, the flow of respective processes (20*a*, 20*b*) are regarded as one task and has only to be switched to time sharing.

Next, the configuration of a store guidance system in the large-scale commercial facilities which is an applied system will be described. This system is a system for assisting the retrieval of an optimum store which a user of the commercial facilities wants and guiding the user from the entrance of the facilities to the store which is a destination. In this system, information from a user is received via an information input terminal TERM of the store guidance system and the information of the user specified by the user recognition function 110 based on a guidance display function 140 with which each HAN is provided and a response operation determination function 150 of SRV 15 is displayed on the information display DSP and on DSP in a store. Service based on a store introduction function, a resting place guidance function and a path guidance function is provided to the user via the information display DSP. Besides, on DSP in a store in the facilities, the information by an action information provision function of a user of the function for providing service to the store in the facilities 170 is provided and PR information by the advertisement function is provided.

Figure 4:
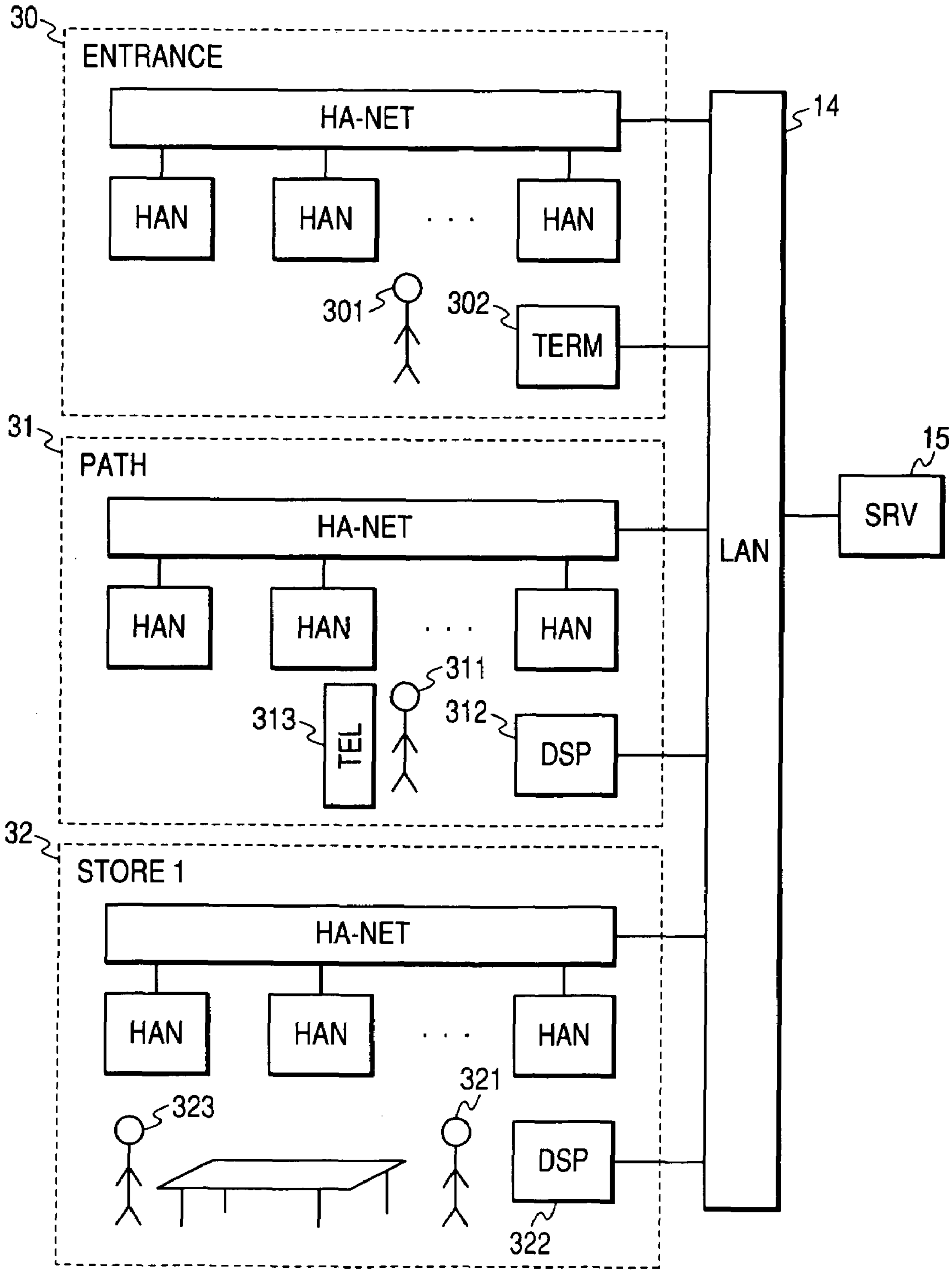
FIG. 4 is a block diagram showing a guidance system for large-scale commercial facilities as a representative example to which the invention is applied.

FIG. 4 is a block diagram showing the whole store guidance system. Plural HANs are arranged in a location such as an entrance (30), a passage (31) and a store (32) in the facilities. Further, corresponding HAN is connected to HAN-NET, and HAN-NETs in plural locations and SRV are connected to LAN. At the entrance (30) of the facilities, the information input terminal TERM (302) for the certification of a user, the specification of his/her ID number, the retrieval of a store and the selection of service is installed. On a path on the way, plural information displays DSP for providing store information and path information to the user are installed. In case the user has a mobile telephone TEL (313) together, the store information and the path information are similarly provided on DSP by the distribution of an electronic mail and the activation of a guidance program also utilizing the mobile telephone.

DSP (322) is also installed in the store (32), and information such as the profile information of a customer who visits later and estimated visit time is also provided to a store clerk (321) by the function for providing service to a store in the facilities in addition to providing merchandise information to the user (323). A function for accepting advertisement for publicizing a store to a user is also provided.

Figure 5:
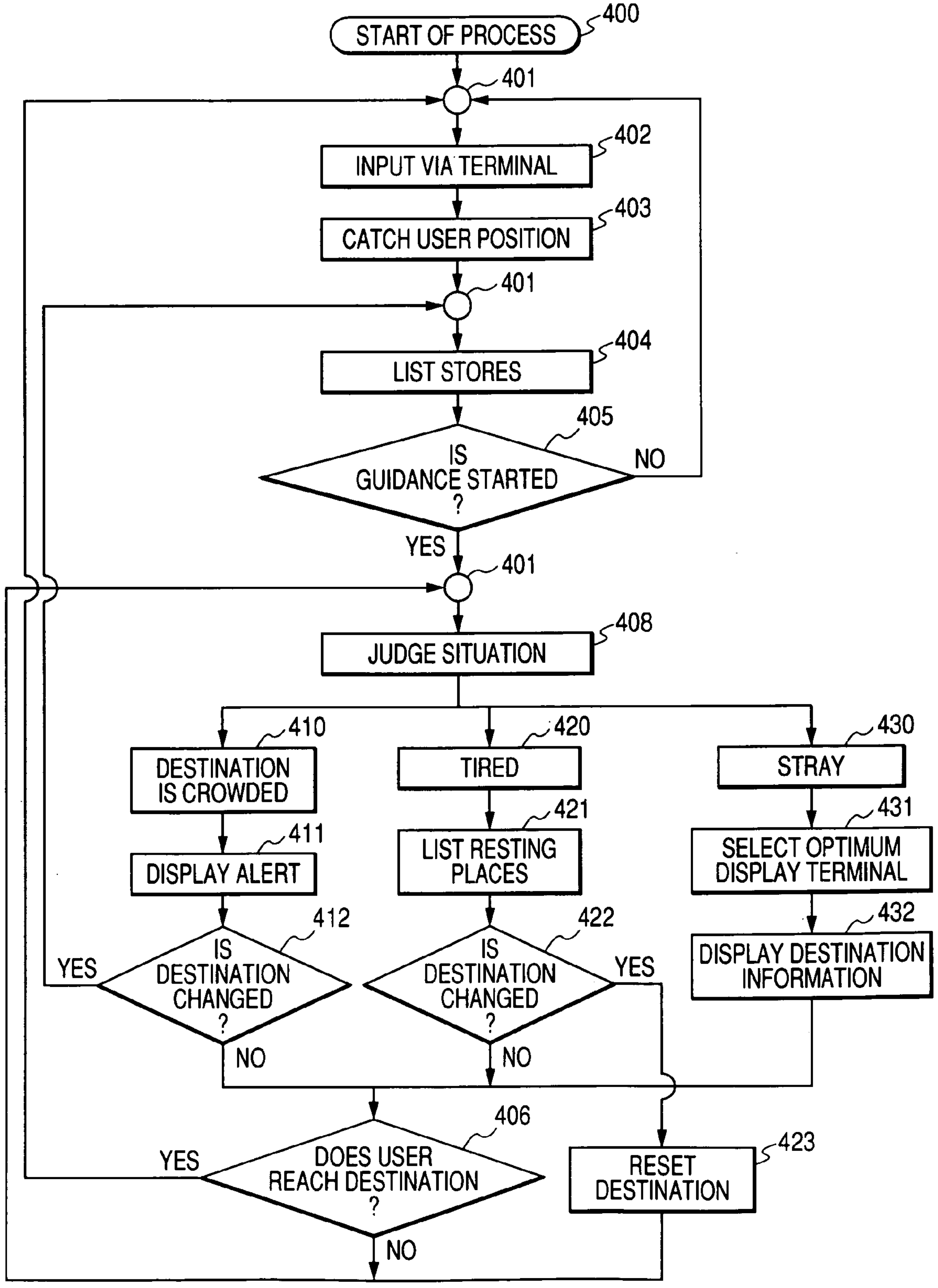
FIG. 5 is a flowchart showing the operation of guidance service.

FIG. 5 is a flowchart showing the whole operation of the store guidance system. A reference numeral 400 in FIG. 5 denotes a starting point and 401 denotes a confluence. A user certifies himself/herself (402) utilizing an IC card and the mobile telephone (313) on the terminal TERM (302) installed at the entrance of the facilities and the system issues an ID number for specifying the user. Next, HAN installed in the vicinity of the terminal captures the position of the user who finishes certification (403).

Next, the user selects service utilized on the terminal (the retrieval of a store and guidance). First, the user inputs basic information such as the type of the desired store on the terminal TERM. The terminal TERM provides a list of stores to the user (404) based on the desired information, also reflecting a situation at that time such as "crowded" acquired by HAN installed on the side of a store in addition to store data such as a menu and the number of seats registered in a database (DB). For example, in case the user wants a store which can be immediately utilized, a crowded store is removed from the list. Further, HAN also recognizes a situation of the user when he/she visits the facilities such as whether the user visits as a member of a group or not, can also select a store in accordance with a form of the visit and can also recommend a store. When the retrieval and the selection of a store are finished, the system inquires of the user whether guidance is to be initiated or not (405). When the user selects the initiation of guidance, the system distributes a destination to the display DSP installed on the path and the mobile telephone TEL which the user has and guides a path to the destination. In case plural users for information to be provided exist, information corresponding to each user is simultaneously displayed on DSP.

Further, HAN installed on the path captures the user as the user moves and sequentially notifies SRV of the position. SRV sequentially judges a situation of the user and a store using the output of HAN by the spatial recognition function (408). For example, in case HAN installed at the destination recognizes that the destination is crowded on the say (410), an alert that the destination is crowded is displayed via TEL or on DSP (411). A degree of crowdedness in a store is acquired by viewing the position and the motion of visitors in the store, the number of visitors who stay in a certain position in the store for fixed time is counted, and in case the number of seats and ratio per unit area are fixed or more/larger, it is judged that the store is crowded. The system requests the user to judge whether the destination is to be changed or not (412) and in case the destination is changed, the stores are listed again (404) and a destination is reset. In case the destination is not changed, guidance is continued. For means for transmitting the intention of the user, an interface of the mobile telephone TEL is used and in addition, the intention of the user is transmitted by a behavior corresponding to "Yes" or "No" of the user, for example, the recognition of the hand laterally waved and the shaken head. That is, a request that service is temporarily halted or resumed can be also immediately transmitted to the system by gesture by HAN on the path.

In case HAN on the path recognizes that the user is tired on the way of guidance and performs the judgment of a situation that he/she is tired (420), HAN provides a list of facilities where users can rest and stores respectively close to the user to TEL or DSP (421) and request the user to judge whether the user utilizes the resting place or not. In case the user selects the resting place (422), HAN resets the destination to the resting place (423) and starts new guidance. In case the user makes selection that the user utilizes no resting place, HAN continues guidance toward the initial destination. Further, in case HAN recognizes a situation that the user loses his/her way, it searches the display terminal DSP close in a direction in which the user advances (431) based on situation judgment that he/she loses his/her way (430), displays a right direction of movement when the user approaches the display terminal (432), and continues guidance toward the destination (406). A method of recognizing and judging a situation that the user is stray or tired will be described later. The above-mentioned items of situation judgment are one example and it is desirable that appropriate items according to a situation of the facilities are set and are judged.

Figure 6:
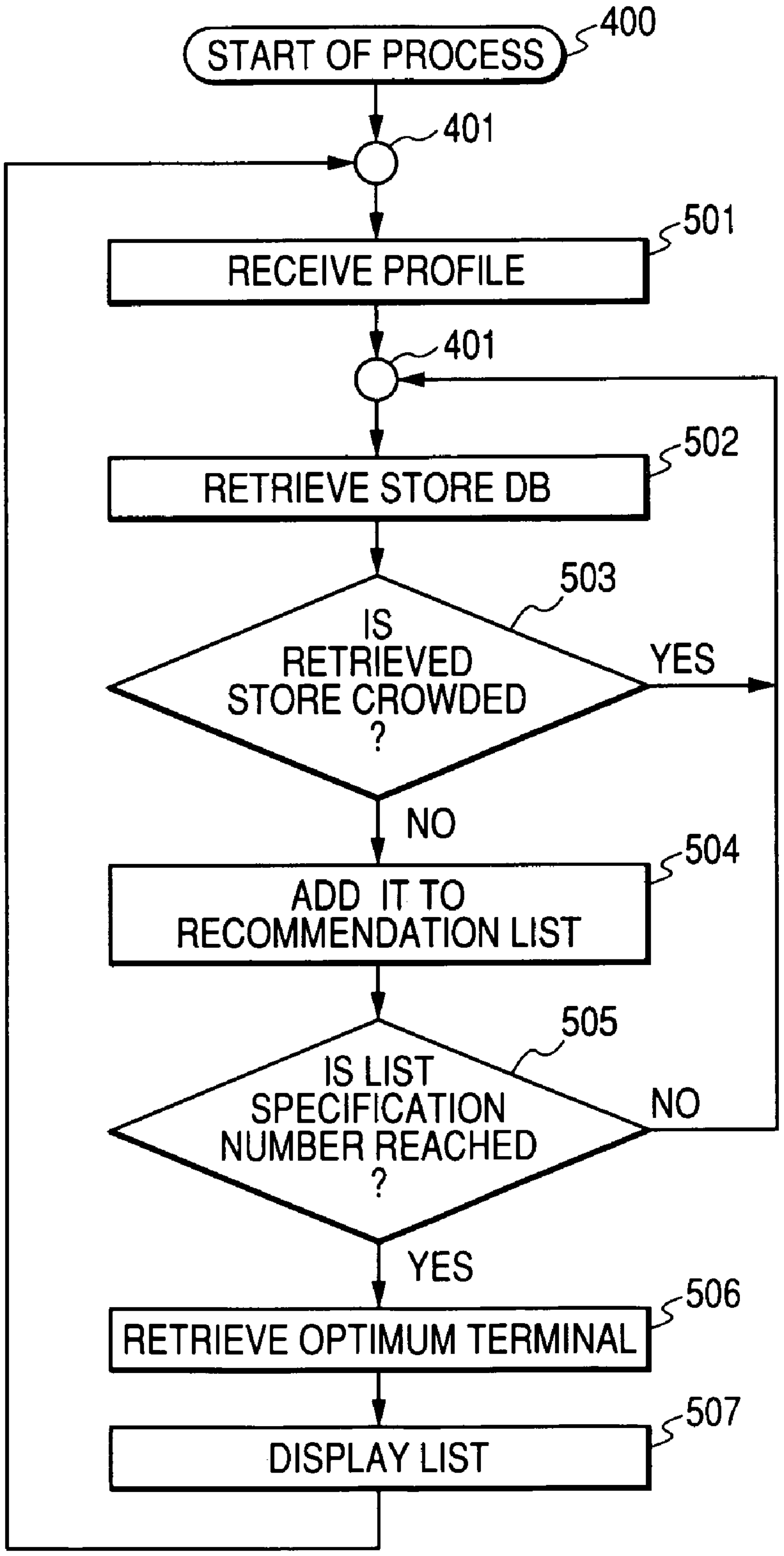
FIG. 6 is a flowchart showing operation for retrieving a store.

Next, a procedure for retrieving a store by a store retrieval module will be described. FIG. 6 is a flowchart for retrieving a store. The certification of a user and the specification of his/her ID number are performed by the terminal TERM (202) installed at the entrance (20) and profile information is downloaded (501). The profile information is personal information including an age, the distinction of sex, a hobby and taste, is input by the corresponding user beforehand, and is stored in an IC card and a mobile telephone. In addition, DB information held by the system including the history of past visits of the user and the merchandise purchase history can be also profile information. For the certification of a user, in addition to an IC card and a mobile telephone, any means that can specify and certify an individual such as bio-certification technique utilizing a face, a fingerprint, a vein of a finger and others may be also used.

When the acceptance of the profile is completed, a store is retrieved based on user profile information and based on a situation in utilization of the user such as the taste of the user and a visit as a member of a group based on the profile and the history from store DB registered in SRV (502). A degree of crowdedness is inquired HAN installed in an extracted store (503) and in case the store is not crowded, the store is added to a candidate list (504). In case the store is crowded, the next candidate is retrieved and similarly, a degree of crowdedness is inquired. In case the number of store lists configured as described above extracts a number specified beforehand, retrieval is finished. In case the number of store lists does not reach the specified number, the retrieval of store DB is continued (502). After the above-mentioned store retrieval is finished, the position and a direction of the movement of the user are detected by HAN and to provide the result of retrieval to the user, the display terminal DSP or the mobile telephone TEL of the user is retrieved (506). Afterward, a store recommendation list which is the result of retrieval is displayed on DSP or TEL (507).

Figure 7:
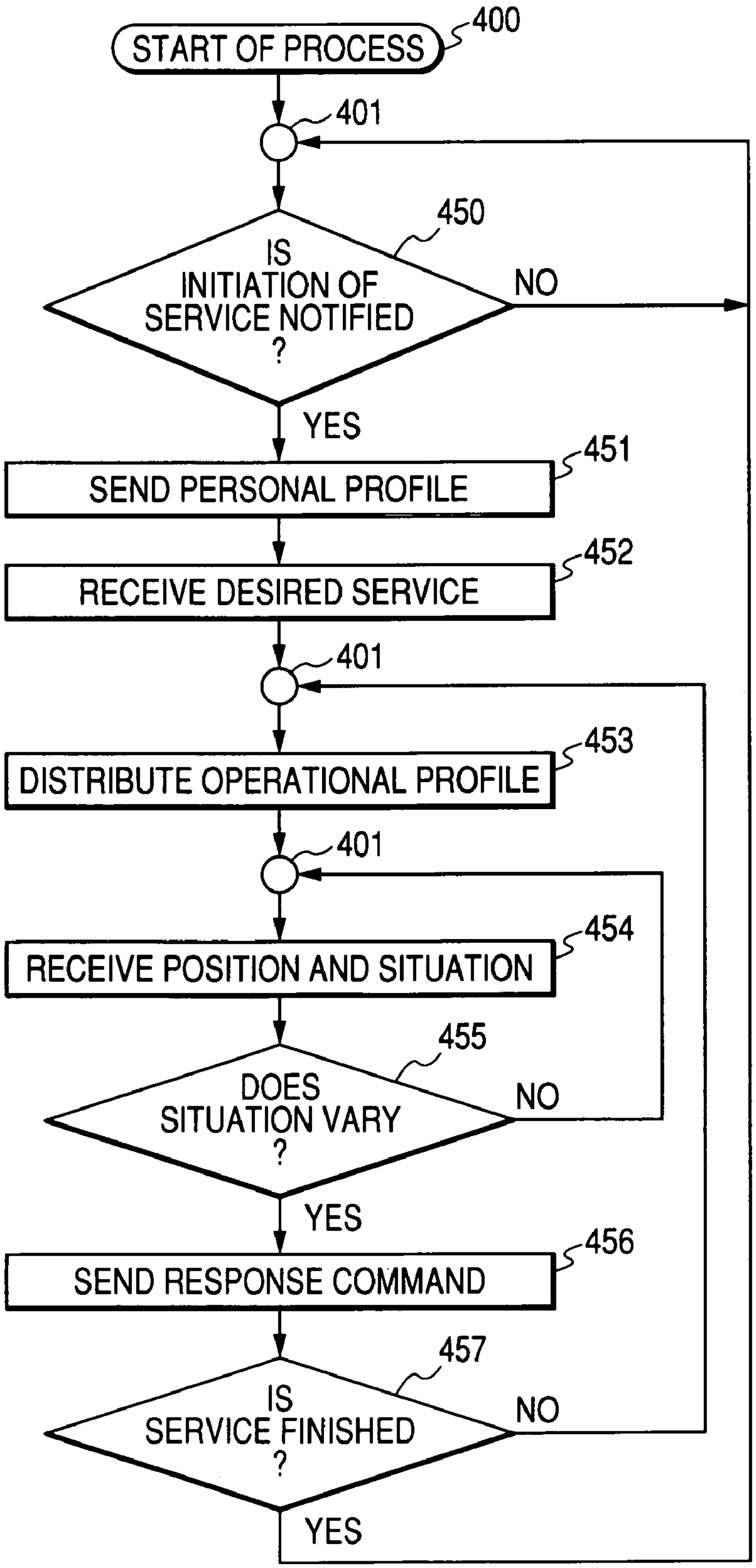
FIG. 7 is a flowchart showing the operation of the server SRV.

Next, processing by the server SRV (15) when the above-mentioned service is provided by the service provision function to the user will be described. FIG. 7 shows a flow of a process by SRV. SRV is first notified of the initiation of service from TERM (450) when a user initiates certification on the terminal TERM (202). When the certification of the user is finished, TERM notifies SRV of his/her ID number and SRV sends the personal information of the user to TERM based on it (451). Next, as described above, the user retrieves a store on TERM utilizing the store introduction function and selects desired service. SRV receives service information from TERM and generates a profile of an environment in which the operation of HAN is defined. SRV distributes the profile to HAN which captures the user (453). SRV is notified of the position and the situation by HAN every fixed time or when a situation of the user varies (454). In case the situation varies (455), for example, in case it is detected that the user enters a store and loses his/her way, SRV sends a response command for displaying store information and path information for example to DSP (312) or TEL (313) of the user if necessary (456). In case service is continued, SRV sends a profile in which the next operation is defined to HAN in response to the variation of the situation again (453) and repeats the above-mentioned operation. In case service requested by the user is finished such as the user reaches a destination or the user quits the facilities, SRV waits for the notification of new service. In case plural objects of service exist, SRV executes plural tasks for the objects with the above-mentioned flow of the process as one task. As the task of SRV includes only the management of a situation, a load per a task is very small.

Next, a procedure for detecting the position of plural visitors using the user position capture function by the linkage of plural HANs in view of the motion of the visitors will be described. This process is executed using the moving object extraction module, the traffic line trace module and the body part recognition module.

Figure 8:
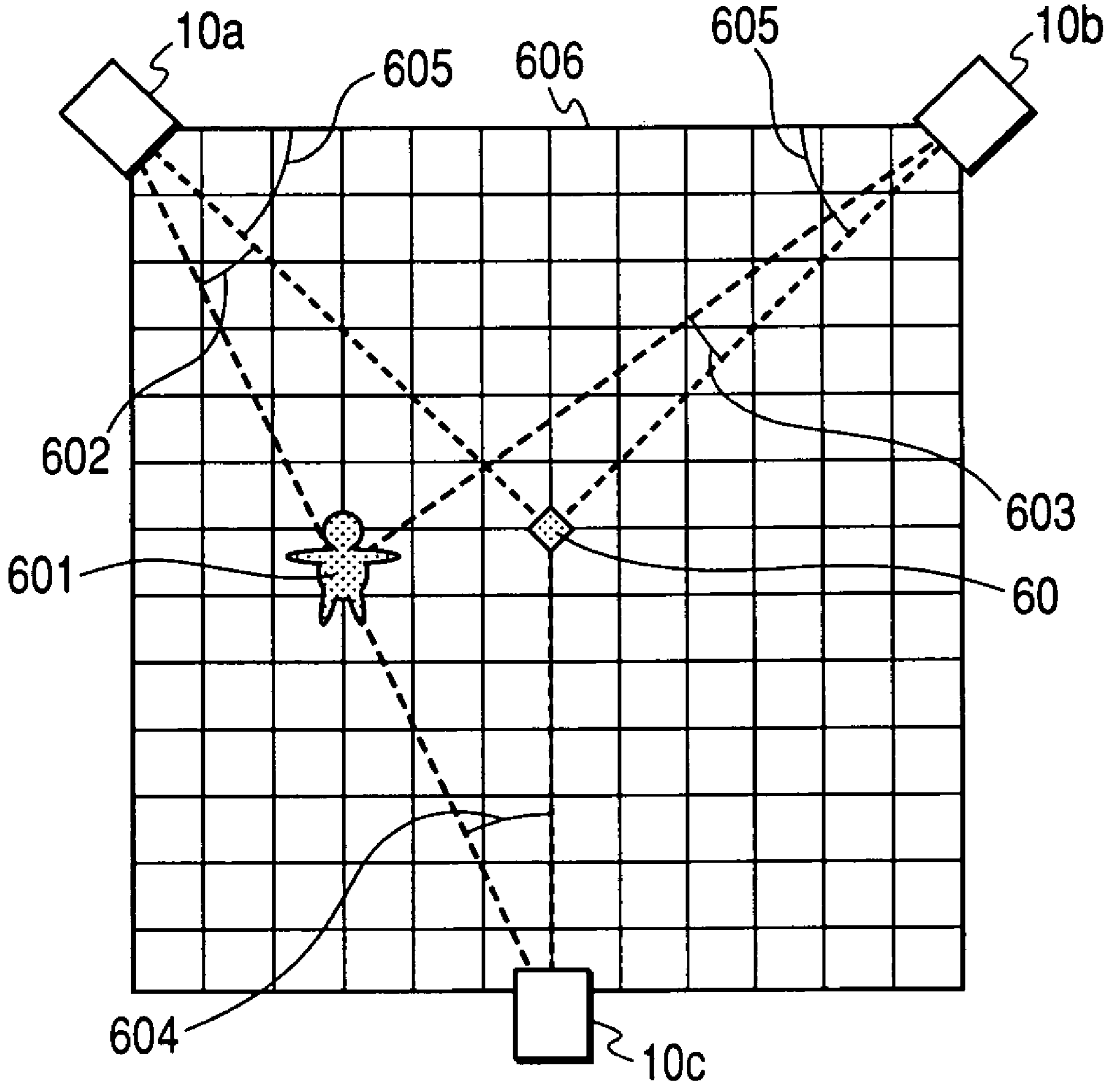
FIG. 8 is an explanatory drawing for explaining the arrangement of the nodes in unit space for positional detection and a position calculating method.
Figure 9:
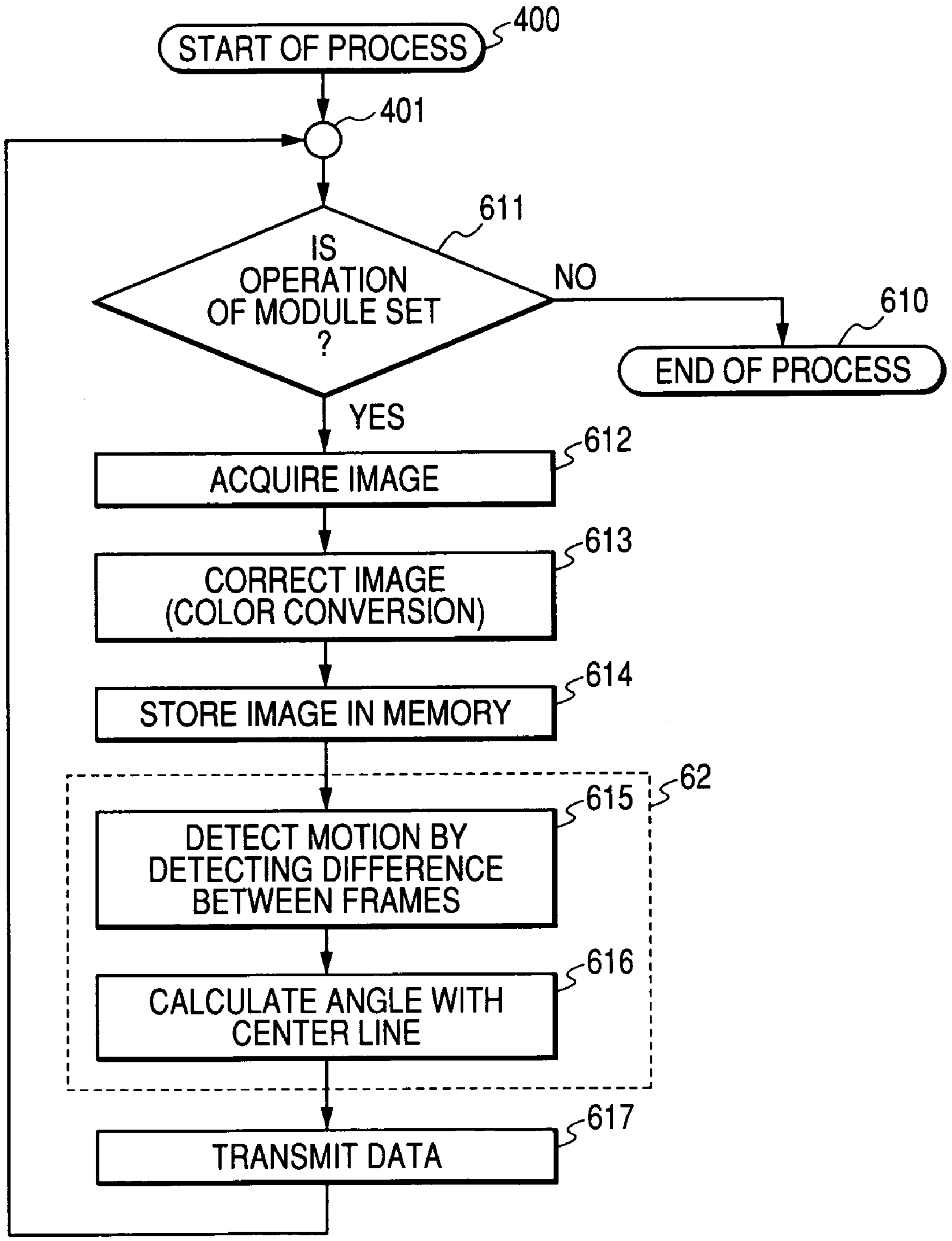
FIG. 9 is a flowchart showing operation for detecting spatial position in the node.

First, FIG. 8 shows the arrangement of HANs 10*a*, 10*b*, 10*c*) in unit space (3 m×3 m). FIG. 9 is a flowchart showing the detection of a spatial position, that is, a process using the moving object extraction function in HAN.

A direction of the camera is determined so that the center line of each HAN is coincident with a center point (60) in unit space. The moving object extraction module is distributed to HAN from SRV beforehand and HAN initiates the detection of the position according to an instruction of SRV (611). First, an image is acquired from the camera CAM (612), YUV-RGB color conversion and filtering correction (613) are applied to the image, and the image is temporarily stored in the memory RAM (614). Next, a motion is detected as a moving object by calculating difference between frames (615), an angle θ in a horizontal direction between the camera and a center point of the object is calculated (616), and angle information is sent to HAN (10*a* in this case) that executes the position calculation module (617). The position calculation module is distributed to any one HAN 10*a*) in the unit space from SRV.

Figure 10:
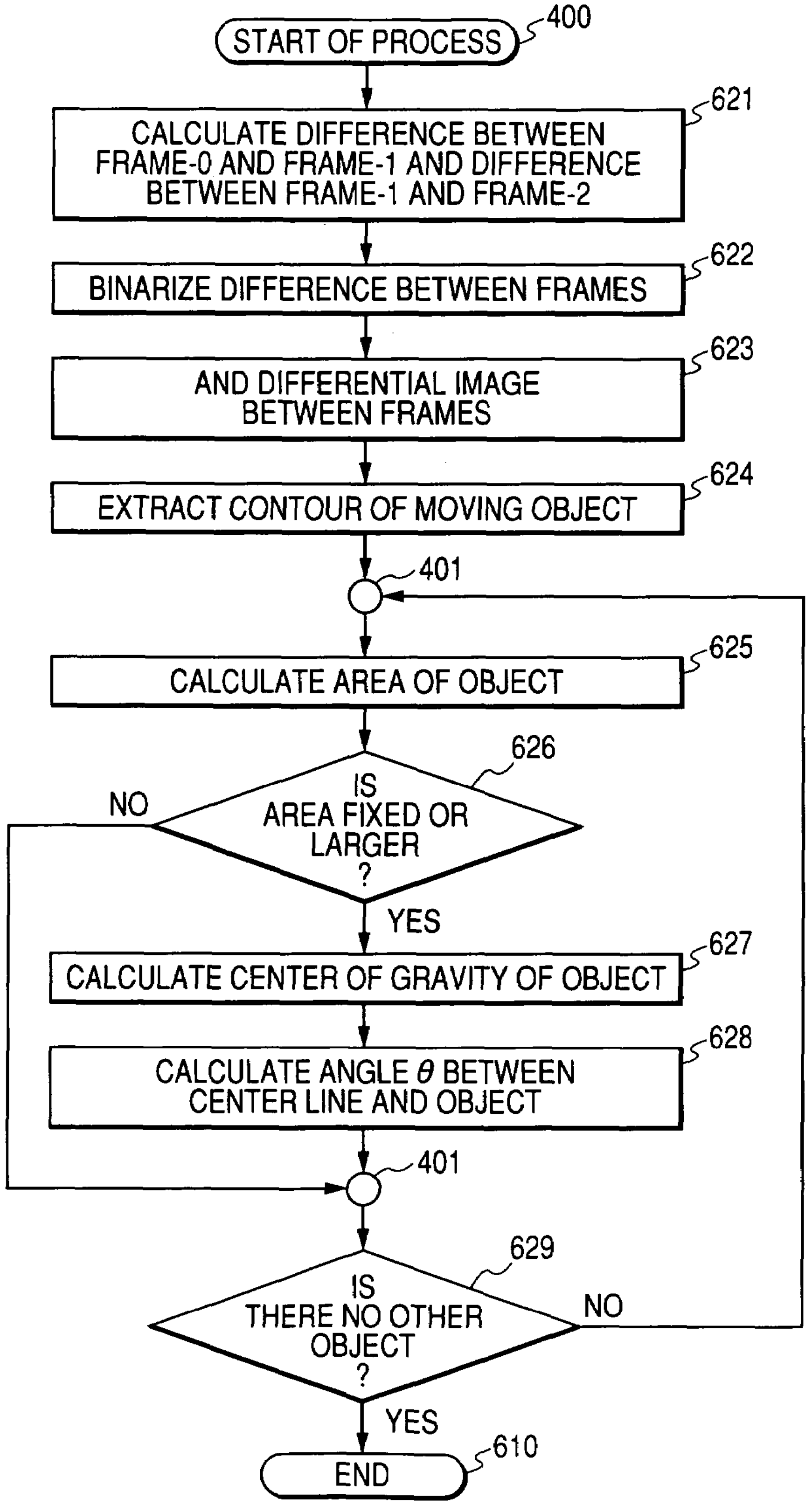
FIG. 10 is a flowchart showing the extraction of a moving object in the node.

FIG. 10 shows the details of a flow (62) since the detection of a motion by the moving object extraction function, that is, based on difference between frames till the calculation of the angle. When the current frame image stored in a frame memory is a frame A, the last frame image is a frame B and the last second frame image is a frame C, first, difference between corresponding picture elements of the frame A and the frame B and difference between corresponding picture elements of the frame B and the frame C are calculated (621). Next, in case each differential value is smaller than a determined threshold, that is, in case corresponding picture elements of the former and latter frames are regarded as same, the picture elements are masked with black, in case the differential value exceeds the threshold, the picture elements which can be regarded as moving are masked with white, and the binary image of the motion is generated (622). Next, a moving object is extracted by ANDing respective differential images between the frames A and B and between the frames B and C (623).

The contour of the extracted object is extracted (624) and the area of the object is calculated (625). A moving object generated by noise can be removed by calculating only the angle of the object the area of which is fixed or larger (626), since the area of the object generated by noise is usually much smaller than that of the target object which is a person. The center point is calculated based on the coordinates of the contour of the moving object and an angle θ in the horizontal direction between the center line of the camera and the center point of the object is calculated. In case plural objects exist, the above-mentioned process is repeated until no moving object exists (629). Finally, the number of objects the detected area of which is fixed or larger and the angle θ of the corresponding object are calculated and are sent to the position calculation module (10*a*) according to a format shown in FIG. 11.

Figure 11:
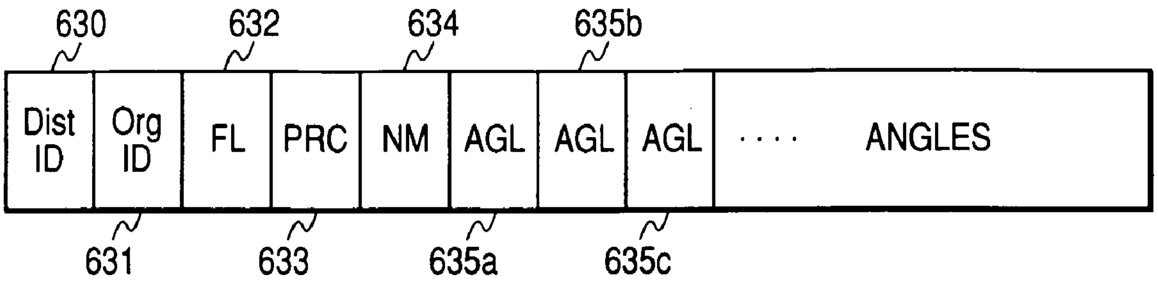
FIG. 11 shows a data format for transmitting the result of detecting a spatial position to a positional arithmetic unit.

FIG. 11 shows a format when the angle information of a moving object detected by each HAN is sent. A reference numeral (630) denotes an address of HAN (10*a*) that executes the position calculation module, (631) denotes an address of each HAN, (632) denotes a flag showing a data transmission direction between HANs, (633) denotes the type of data (in this case, a flag showing that data is angle information), (634) denotes the number of detected moving objects, and (635*a* to 635*c*) denote the angle θ of an object. The number of moving objects and each angle information are sent to HAN (10*a*) and are stored in RAM in corresponding HAN.

Figure 12:
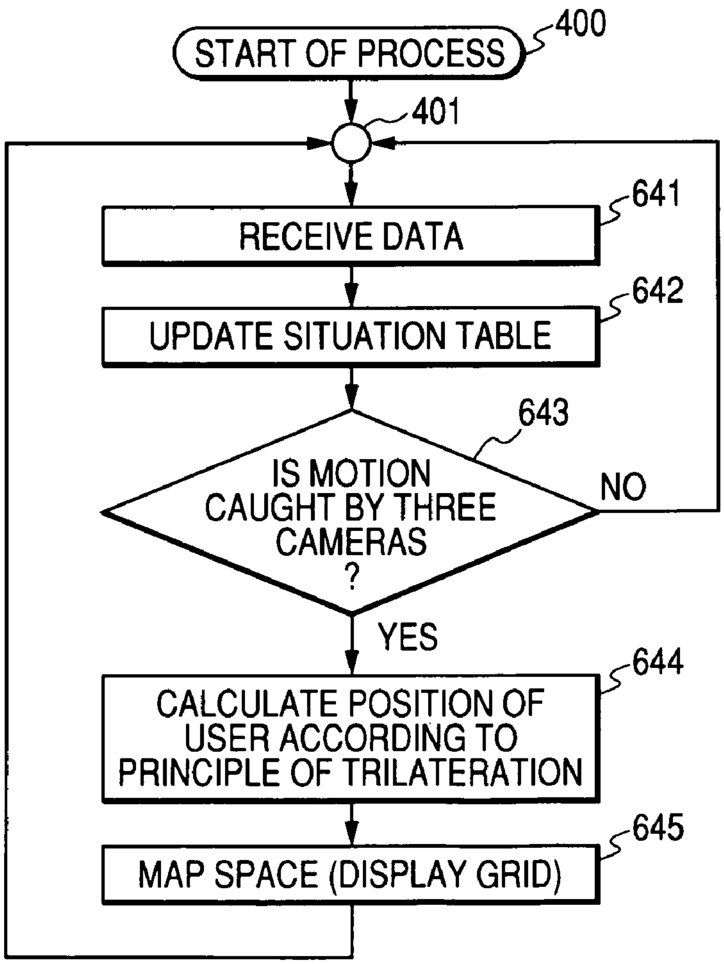
FIG. 12 is a flowchart showing operation for calculating a spatial position in the node.

Next, a method of calculating the positions of plural persons based on θ sent from HAN (10*a*, 10*b*, 10*c*) will be described. FIG. 12 shows a spatial position calculation flow in HAN 10*a*). HAN (10*a*) receives angle information θ from each HAN (641) and stores it in RAM (642). When θ from each camera reaches (643), the position of a user (a moving object) is determined (644) according to a principle of trilateration.

The position of a moving object (601) is determined as follows. First, suppose that angle information (602) acquired from HAN (10*a*) is θ1, angle information (603) acquired from HAN (10*b*) is θ2, the spatial position of HAN (10*a*) is an origin and distance (606) between HAN (10*a*) and HAN (10*b*) is d. As an angle (605) θ' between the corresponding node and the straight line (606) and d are known, the position of the moving object (601) is determined by a trigonometric function based on θ1 and θ2.

However, when two or more moving objects (601) to be detected exist in the detection of the position by the above-mentioned method, correspondence to maximum four points is required and the positions of plural moving objects cannot be simultaneously determined. Then, the position of the corresponding moving object is determined based on plural corresponding points by using angle information (604) θ3 acquired in HAN (10*c*) after the determination of the position based on θ1 and θ2. That is, the position is calculated by verifying the consistency of coordinate data based on the coordinate data of the corresponding points, the spatial position of HAN (10*c*) and the angle θ3. Positional information is calculated in the units of a grid of 30-cm precision and is notified to SRV. Position recognition precision can be enhanced by arranging fourth and fifth HANs in addition to three HANs so that an area to be dead space because of an obstacle and others is covered. In this position determination method, frame differential motion extraction is used, however, as the method is a process of only proximate three frames, the robustness for the variation of environment is high and the positions of plural moving objects can be simultaneously detected by using three or more cameras. Further, a user can be also identified by the recognition of a pattern such as the color and the design of clothes and a pattern of a face in addition to the detection of the position in this method and can be also traced.

Figure 13:
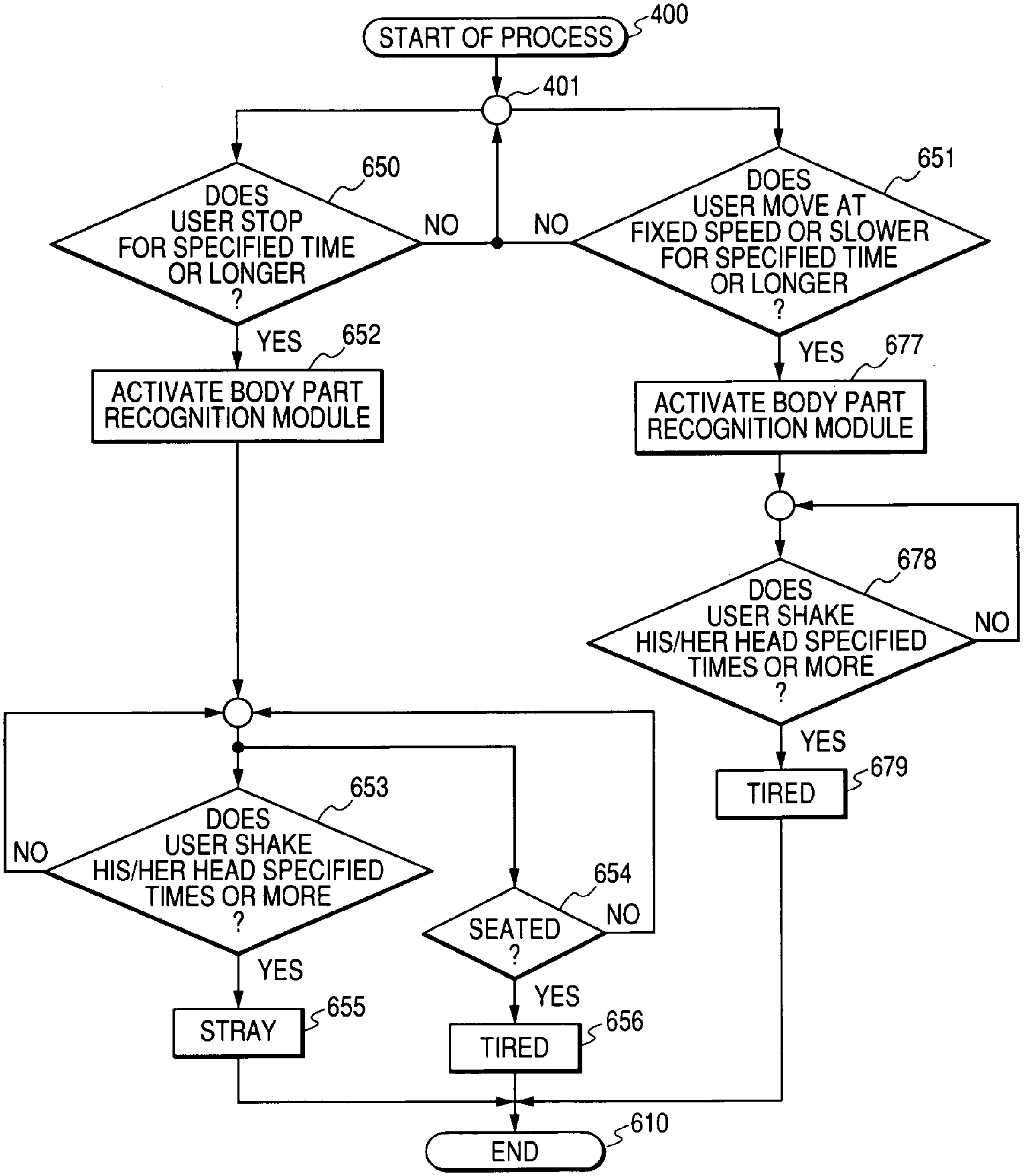
FIG. 13 is a flowchart for judging the situations such as "tired" and "stray" of a user.

Next, unit for judging whether a user is tired or stray, that is, the user's situation judgment function will be described. FIG. 13 shows a flow for judging a situation such as "tired" and "stray". First, a traffic line is observed based on the result of detecting the position of the user and the change of a situation is judged based on a large motion. For example, when it is recognized that the user stays in a fixed location for specified time or longer (650), HAN activates the body part recognition module (652) to capture the motion of the body such as the head and the arm of the user. A body part recognition method will be described later. In case it is recognized that the user shakes his/her head horizontally specified times or more in a situation in which the user stops (653), HAN judges that the user is stray because the user stops and frequently looks around (655). In case it is recognized that the user is seated in a resting area such as on a bench (654), HAN judges that the user is tired because the user is tired and is seated (656). Next, the traffic line is traced by the traffic line trace module, in case the cumulative migration length of the user in the facilities is fixed or longer and the traveling speed is slower by a fixed degree (651), the body part recognition module is similarly activated (677), and in case it is recognized that the user shakes his/her head specified times or more, HAN judges that the user is searching a resting place and is tired (679).

Figure 14:
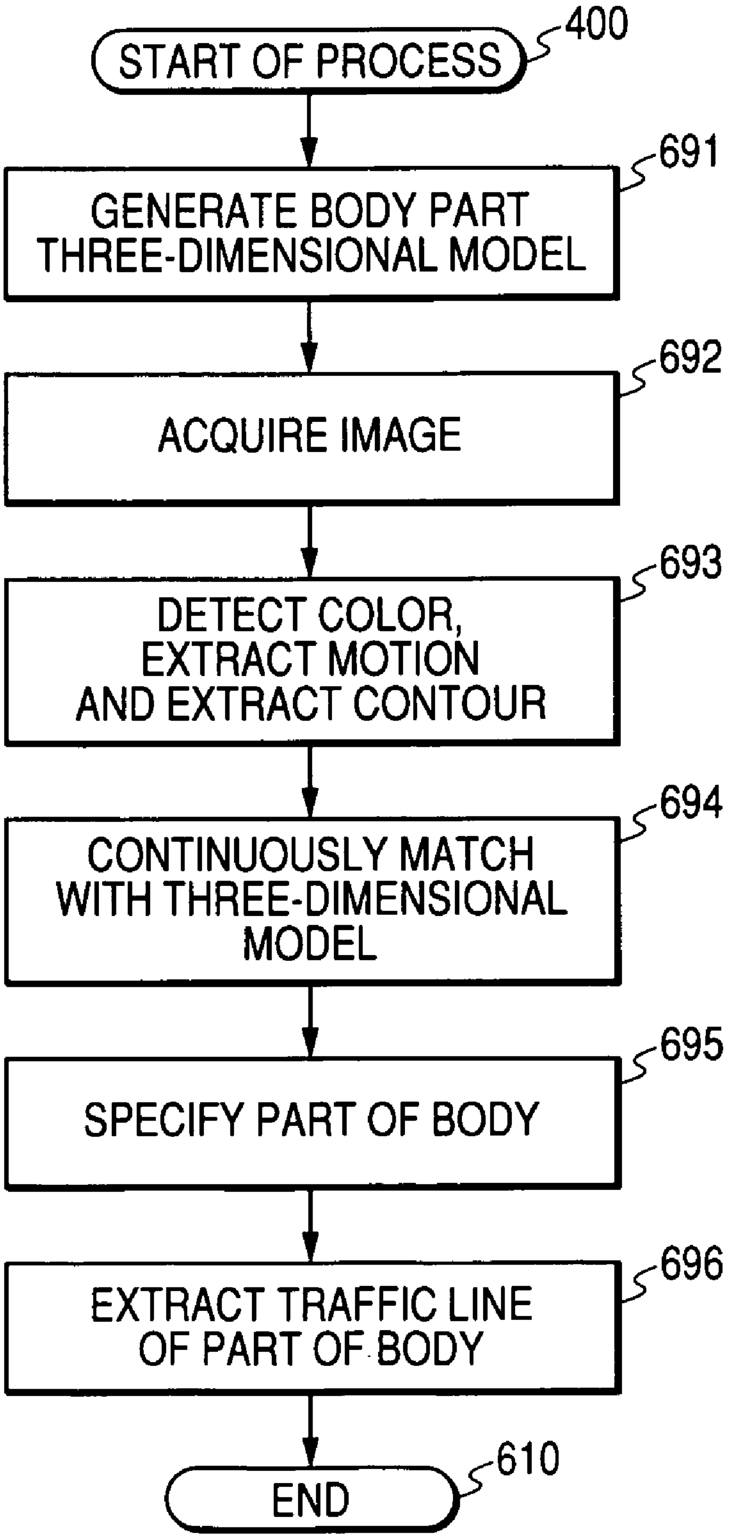
FIG. 14 is a flowchart showing operation for recognizing a part of the body.

Next, a method of recognizing a part of a body required for recognizing the behavior of the user, for example, for recognizing that the user shakes his/her head specified times or more will be described. FIG. 14 shows a flow of processing by the body part recognition module. A process is started and a three-dimensional model already defined of a part of the body (the head, the arm, the hand) is generated inside (691). The three-dimensional model is defined as the three-dimensional coordinate data of a standard form of a part of the body. Next, the contour of a person is extracted by receiving an image from the camera (692), detecting the hue of the skin and extracting a motion described in relation to FIG. 10 (693). Next, generated plural three-dimensional models are continuously reduced/revolved and are compared with the extracted contour (694). For a method of reducing/revolving the three-dimensional model, affine transformation is known and the reduction/the revolution is realized using this. A part of the body is recognized to compare the projected contour of the reduced/revolved model and the contour extracted from the image and to judge whether they are coincident or not and the part of the body, for example, the head is specified (695). For the judgment of coincidence, Euclidean distance between both contours is calculated and if the distance is fixed or shorter, it can be judged that the contours are coincident. Further, the traffic line of a part of the body is extracted (696), a direction and the acceleration of the motion of the corresponding part are calculated and a situation of the operation of the part of the body is judged. For example, in case the motion horizontally reciprocated on the same line at acceleration fixed or larger of the head is detected, it is judged that the head is shaken.

As described above, according to the invention, the information system in which information provision to unspecified users who visit the facilities in the facilities according to the position and the behavior of a user is enabled without the operation of the terminal and others can be configured. That is, when a user of facilities utilizes a target store, a path to the store can be appropriately changed according to a situation at that time of the user himself/herself and a situation of the target store at a destination and the path without having a special terminal and appropriate guidance is performed.

Besides, according to the invention, the information system which can provide a situation at real time in facilities to a user can be configured.

Some characteristics of the invention will be described below.

(1) The in-facility information provision system according to the invention is based on the information processing system provided with the sensor including the camera and the information processing equipment and including the multiple spatial recognition nodes and is characterized in that the plural recognition nodes recognize the position and the behavior of a user in predetermined space by plural recognition unit and appropriate guidance is performed by appropriately changing a path to a destination based on the result of recognition.

(2) Besides, the invention is characterized in that the plural recognition nodes recognize the position and the behavior of a person to be a user in space which is an object of utilization by plural recognition unit, a destination and a path to the destination are appropriately changed corresponding to a situation based on the situation and appropriate guidance is performed.

(3) Besides, the invention is characterized in that a user of facilities is not required to have a special mobile terminal by specifying himself/herself at the entrance of the facilities, providing personal information, selecting service and further, managing the position of the user by the plural recognition nodes.

(4) Besides, the invention is characterized in that plural information displays for distributing guidance information to a user are provided, the information display terminal nearest to the user is selected by the plural recognition nodes and displays information when the user approaches the information display terminal again.

(5) Besides, the invention is characterized in that in case a user has a wireless terminal such as a mobile telephone, guidance information is distributed to the terminal.

(6) Besides, the invention is characterized in that a merchandise service provider of a store and others in facilities acquires customer information beforehand by notifying the provider that a user to be a customer visits the store beforehand.

(7) Besides, the invention is characterized in that the history of the action of a user in facilities and a store is accumulated by the plural recognition nodes.

As described above, according to the invention, smooth guidance according to a situation of a user is enabled by recognizing the situation such as "tired" and "stray" on the way of a path of the user and a situation such as a degree of the crowdedness of a destination and a path to the destination in addition to a function for guiding the path to the destination which has been heretofore provided. In addition to the guidance function described in the embodiment, the invention can be applied to various environments including the collection of marketing information by the investigation of the trend of customers, the management of merchandise and security such as monitoring for the prevention of crimes.

What is claimed is:

1. An in-facility information provision system, comprising:

a plurality of spatial recognition nodes respectively located in plural locations in a facility, each of said spatial recognition nodes has a recognition unit, profile information including response operation corresponding to a situation of a user and a situation of the facility;

a unit for recognizing a position and a behavior of each user in the facility based on information acquired by the recognition unit;

a unit for recognizing a situation of a specific user based on the position and the behavior of the specific user, and recognizing a situation of the facility based on the position and the behavior of each user;

a unit for determining response operation to the specific user based on the situation of the specific user and the situation of the facility using the profile information; and a unit for generating and outputting information on facility guidance for the specific user corresponding to the determined response operation.

2. An in-facility information provision system according to claim 1, wherein the respective spatial recognition nodes include:

a unit for recognizing the position and the behavior of each user in a space by the plural recognition unit and acquiring situation of the specific user and the situation of the facility; and a unit for appropriately changing a destination and a path to the destination corresponding to the situation of the specific user and the situation of the facility and guiding the specific user.

3. An in-facility information provision system according to claim 1, further comprising:

a unit for specifying a user of the facilities himself/herself at an entrance of the facilities, setting personal information and selecting service; and a unit for managing the position of the user based on the set information by the plural spatial recognition nodes and providing the selected service.

4. An in-facility information provision system according to claim 1, wherein plural information displays connected to each spatial recognition node via a communication network for providing store information and path information to the user are installed at an entrance, on a passage and in each store; and the specific user is detected by a cooperative recognition process by the plural nodes and information for the user is displayed based on the result of detection when the user approaches any of the plural information display terminals.

5. An in-facility information provision system according to claim 1, further comprising:

a unit for distributing guidance information to the terminal in case the user has a wireless terminal such as a mobile telephone.

6. An in-facility information provision system according to claim 1, wherein a merchandise service provider in a store in the facility can acquire customer information before the user visits the store by notifying the provider that the user to be a customer will visit the store beforehand.

7. An in-facility information provision system according to claim 1, wherein the history of the action of the user in the facility and in a store is stored in the plural spatial recognition nodes.

8. An in-facility information provision system according to claim 1, wherein at least three spatial recognition nodes are installed in a position in which the user can be caught in any location of at least an entrance, a passage and each store in the facilities;

wherein the spatial recognition nodes are mutually connected via a communication network;

wherein a master that executes an integrated control process between the plural spatial recognition nodes and the information display terminals is dynamically determined; and wherein the node or the information display terminal which is the master simultaneously executes the integrated control process.

9. An in-facility information provision system according to claim 8, wherein when a user to be recognized moves from target space to adjacent space, a master of the corresponding space traces the user by handing over the environment to a master of a system in the adjacent space.

10. A server for controlling an in-facility information provision system, comprising:

a unit for managing plural spatial recognition nodes respectively installed in plural locations in a facility and each respectively having a recognition unit;

a unit for receiving a position and a behavior related to each user in the facility recognized by the spatial recognition node;

a unit for grasping a situation of a specific user based on the position and the behavior of the specific user, and grasping a situation of the facility based on the position and the behavior related to each user; and a unit for displaying path information for providing to the specific user based on the situation of the specific user and the situation of the facility when the specific user approaches any information display installed in the facility.

11. Information processing equipment provided to plural spatial recognition nodes respectively installed in plural locations in a facility and respectively having a recognition unit, comprising: profile information which includes a response operation corresponding to a situation of a user and a situation of the facility;

a unit for recognizing a position and a behavior of each user in the facility based on information acquired by the recognition unit;

a unit for recognizing a situation of a specific user based on the position and the behavior of the specific user, and recognizing a situation of the facility based on the position and the behavior of each user;

a unit for determining a response operation to the specific user based on the situation of the specific user and the situation of the facility using the profile information; and a unit for generating and outputting information on facility guidance for the specific user corresponding to the determined response operation.

12. An in-facility information provision method in an information processing system comprising a plurality of spatial recognition nodes installed in the facility, each of which has a recognition unit and profile information which includes a response operation corresponding to a situation of a user and a situation of the facility, the in-facility information provision method comprising the steps of:

recognizing a position and a behavior of each user in the facility based on information acquired by the recognition unit;

recognizing a situation of a specific user based on the position and the behavior of the specific user, recognizing a situation of the facility based on the position and the behavior of each said user;

determining a response operation to the specific user based on the situation of the specific user and the situation of the facility using the profile information; and generating and outputting information on facility guidance for the specific user corresponding to the determined response operation.

13. An in-facility information provision method according to claim 12, wherein:

the position and the behavior of each user in a space are recognized by the plural recognition units in the plural spatial recognition nodes in the facility and the situation of the specific user and the situation of the facility are acquired; and a destination and a path to the destination are appropriately changed corresponding to the situation of the specific user and the situation of the facility and guidance is performed.

14. An in-facility information provision method according to claim 12, wherein:

plural information displays for distributing guidance information to the user are provided in the facility; and an information display terminal nearest to the user is selected by the plural spatial recognition nodes and displays information when the user approaches the information display terminal again.

15. A machine-readable medium storing a computer program for an in-facility information provision system in which plural spatial recognition nodes are respectively installed in plural locations in a facility and each spatial recognition node has a recognition unit and information processing equipment including a computer, wherein:

the in-facility information provision system is provided with profile information which includes a response operation corresponding to a situation of a user and a situation of the facility; and the computer program instructs a computer to realize:

a function for recognizing a position and a behavior of each user in the facility based on information acquired by the recognition unit;

a function for recognizing a situation of a specific user based on the position and the behavior of the specific user, and recognizing a situation of the facility based on the position and the behavior of each user;

a function for determining a response operation to the specific user based on the situation of the specific user and the situation of the facility using the profile information; and a function for generating and outputting information on facility guidance for the specific user corresponding to the determined response operation.

16. A machine-readable medium according to claim 15, wherein:

the computer program instructs the computer to realize:

a function for selecting an information display terminal nearest to the specific user; and a function for displaying a destination and a path to the destination for the specific user corresponding to the determined response operation on the information display terminal.

* * * * *